Figure 1:
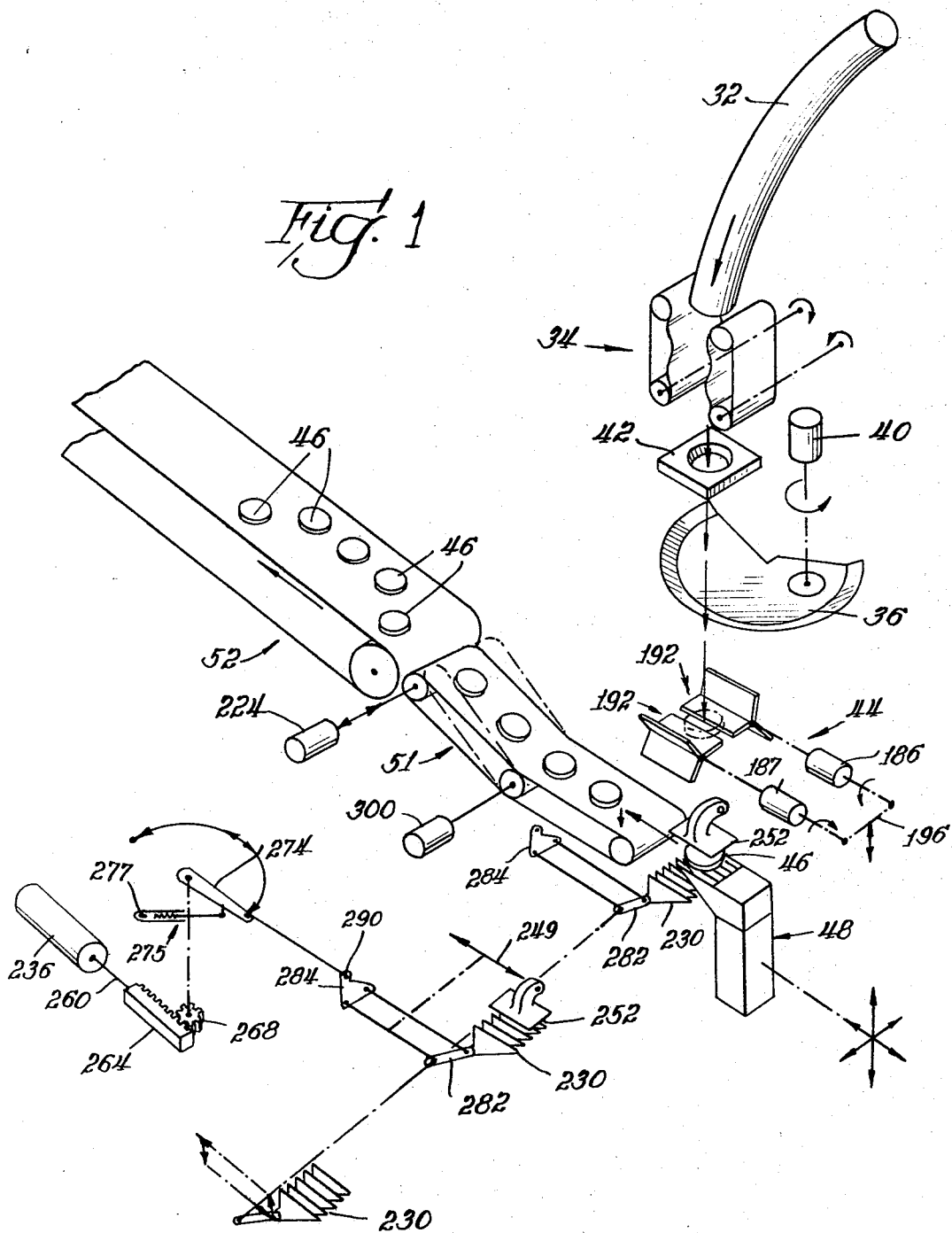

United States Patent [19]
Bajcar et al.

[11] 3,834,515
[45] Sept. 10, 1974

[54] RAPID ACTION ARTICLE TRANSFER APPARATUS

[75] Inventors: Miles S. Bajcar, Palos Hills; Gary Leonard Wallace, Oak Lawn; John J. Linehan, Arlington Heights, all of Ill.

[73] Assignee: Chemetron Corporation, Chicago, Ill.

[22] Filed: Sept. 28, 1972

[21] Appl. No.: 293,157

[52] U.S. Cl. .................................. 198/27, 198/39
[51] Int. Cl. ........................................... B65g 47/00
[58] Field of Search ............ 198/20, 39, 27; 271/54, 271/84; 214/6 DK, 1 BB

[56] References Cited
UNITED STATES PATENTS

| | | | |
|---|---|---|---|
| 2,954,863 | 10/1960 | Staples | 198/27 |
| 3,037,608 | 6/1962 | Rothchild | 198/20 |
| 3,233,750 | 2/1966 | Bannon | 214/1 BB |
| 3,375,941 | 4/1968 | Repper | 198/27 |
| 3,456,774 | 7/1969 | Blickendorfer | 198/20 |

Primary Examiner—Richard E. Aegerter

[57] ABSTRACT

Apparatus for rapidly transferring successively deposited groups of material such as sliced food product from a platform such as a scale platform to a conveyor or the like. The platform is provided with a plurality of slots to accommodate the fingers of a pickup platen which moves upwardly to pick up material on the platform and after pickup moves laterally away from the platform to deposit the material at a remote location on a downward stroke. After depositing the material the platen moves back toward the platform for the next pickup and thus travels in a repetitive pattern resembling a parallelogram for each pickup of material. A stop member is provided to move with the platen and prevent the material from jumping off the platen during pickup and lateral movement away from said platform.

9 Claims, 6 Drawing Figures

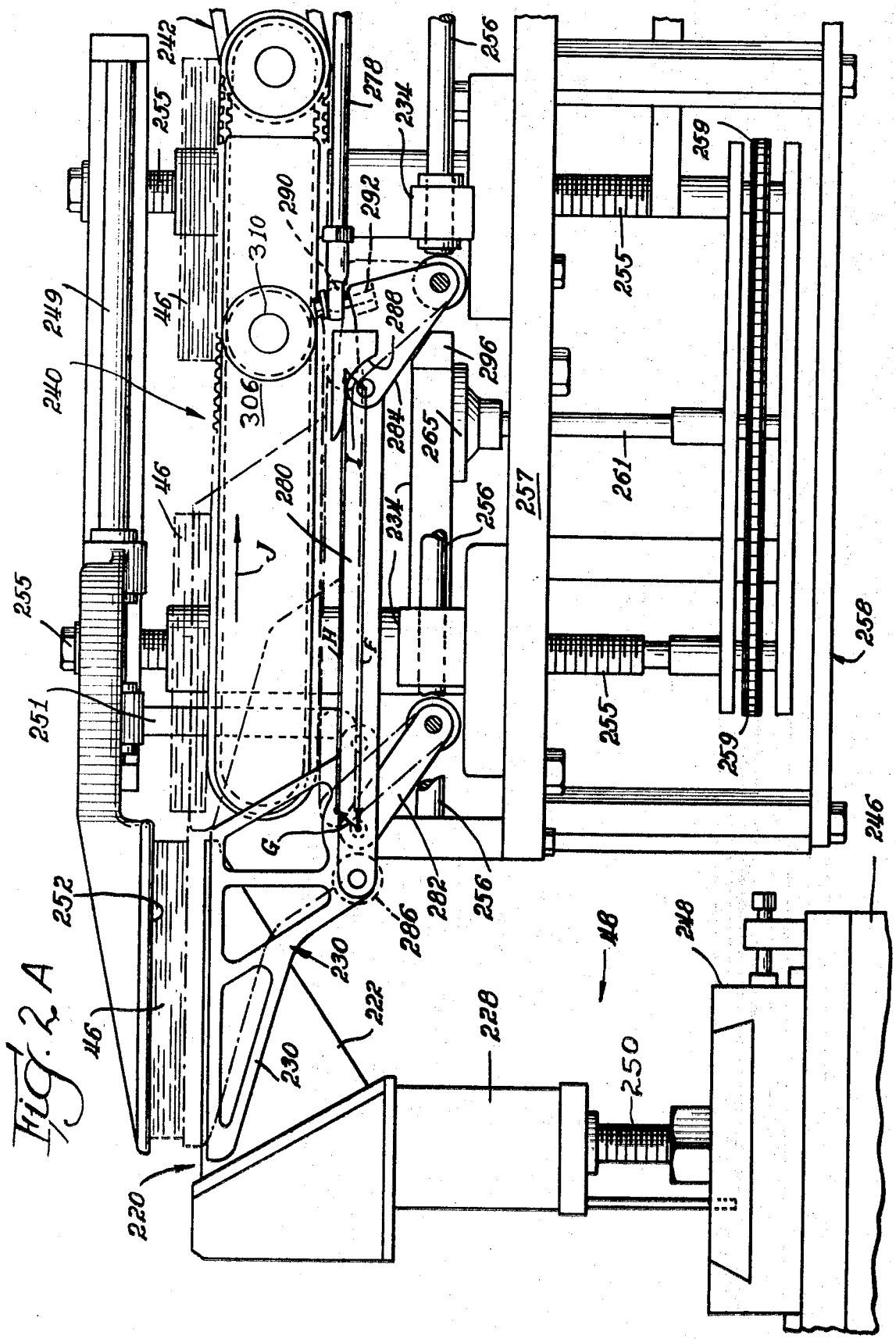

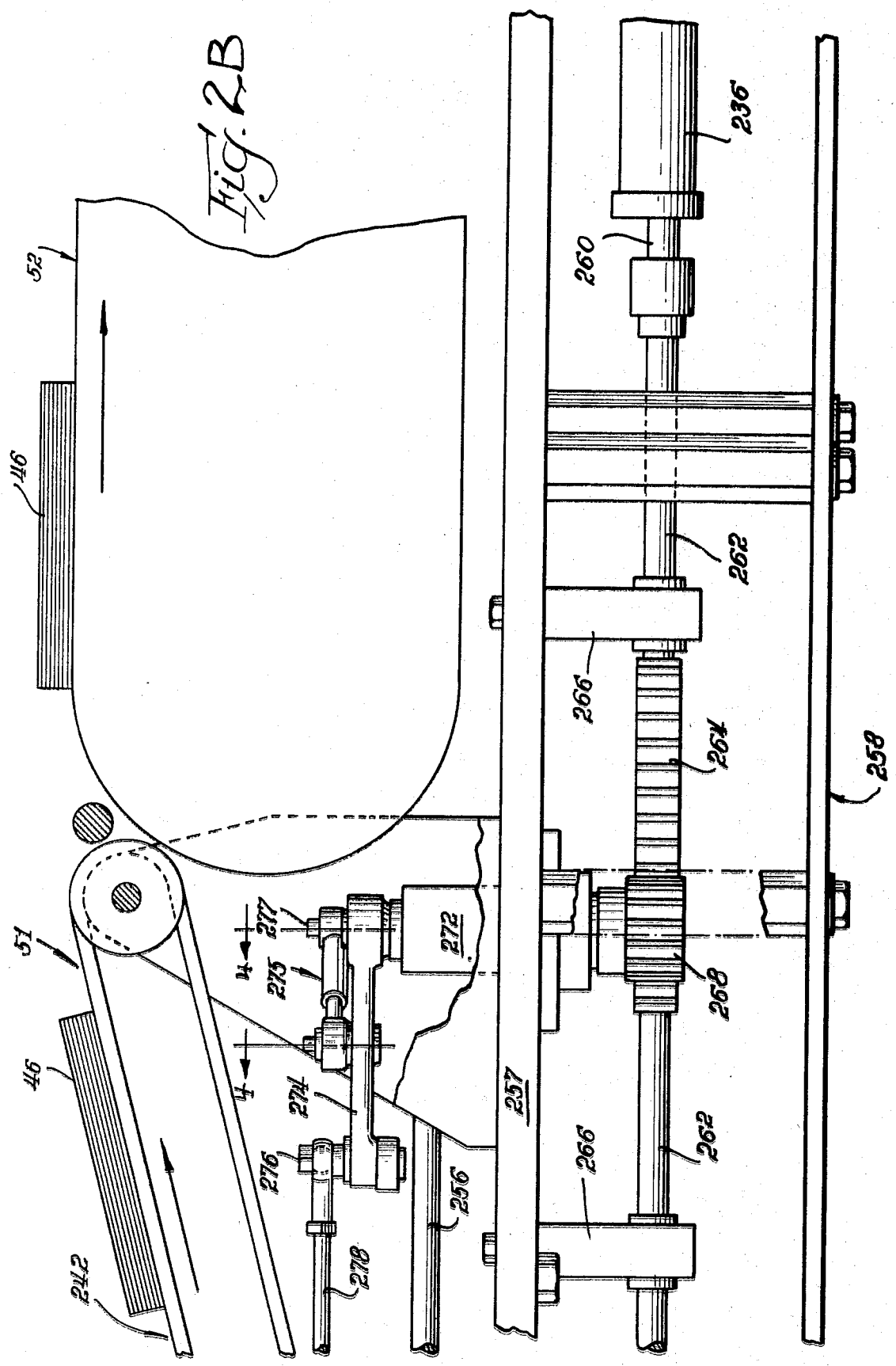

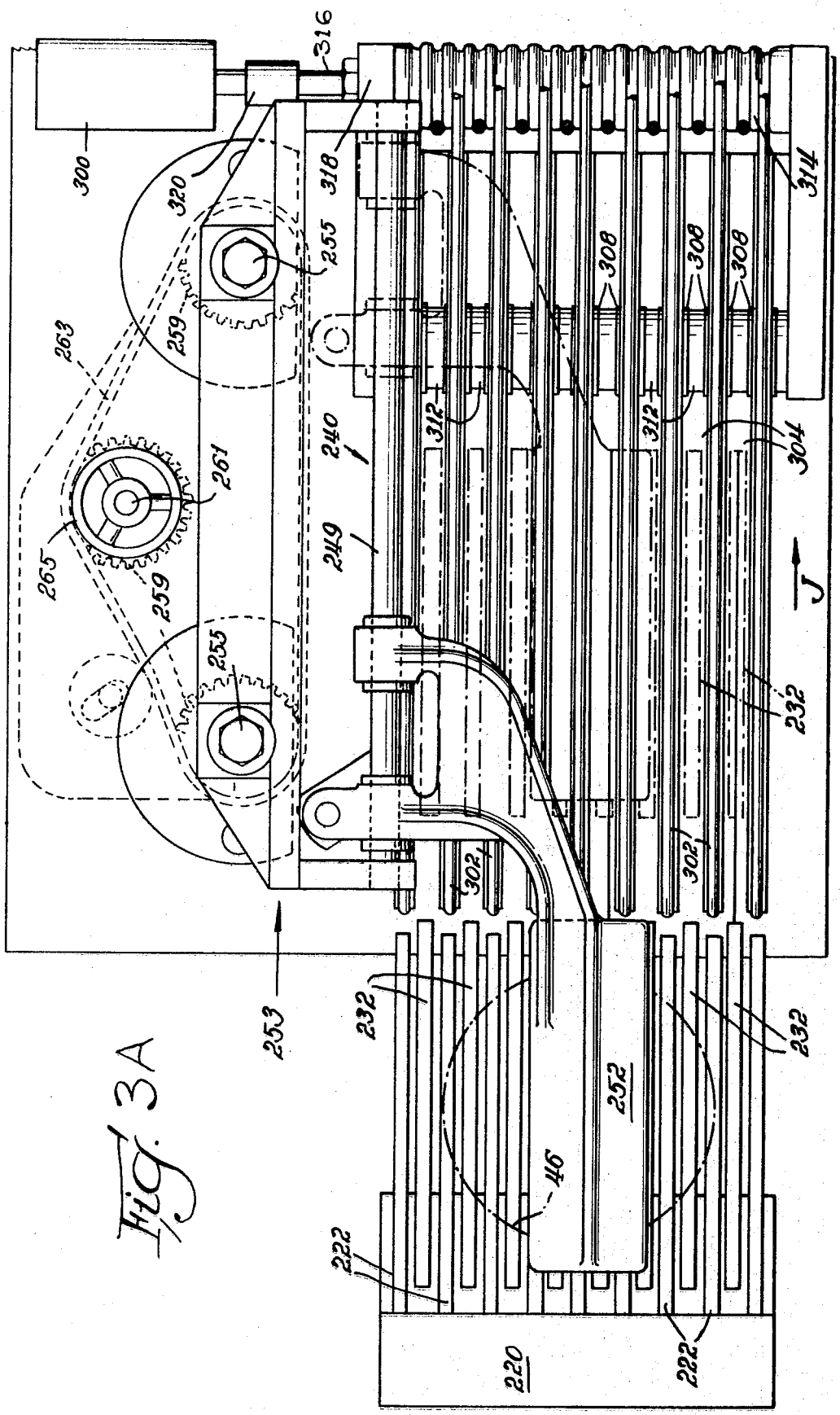

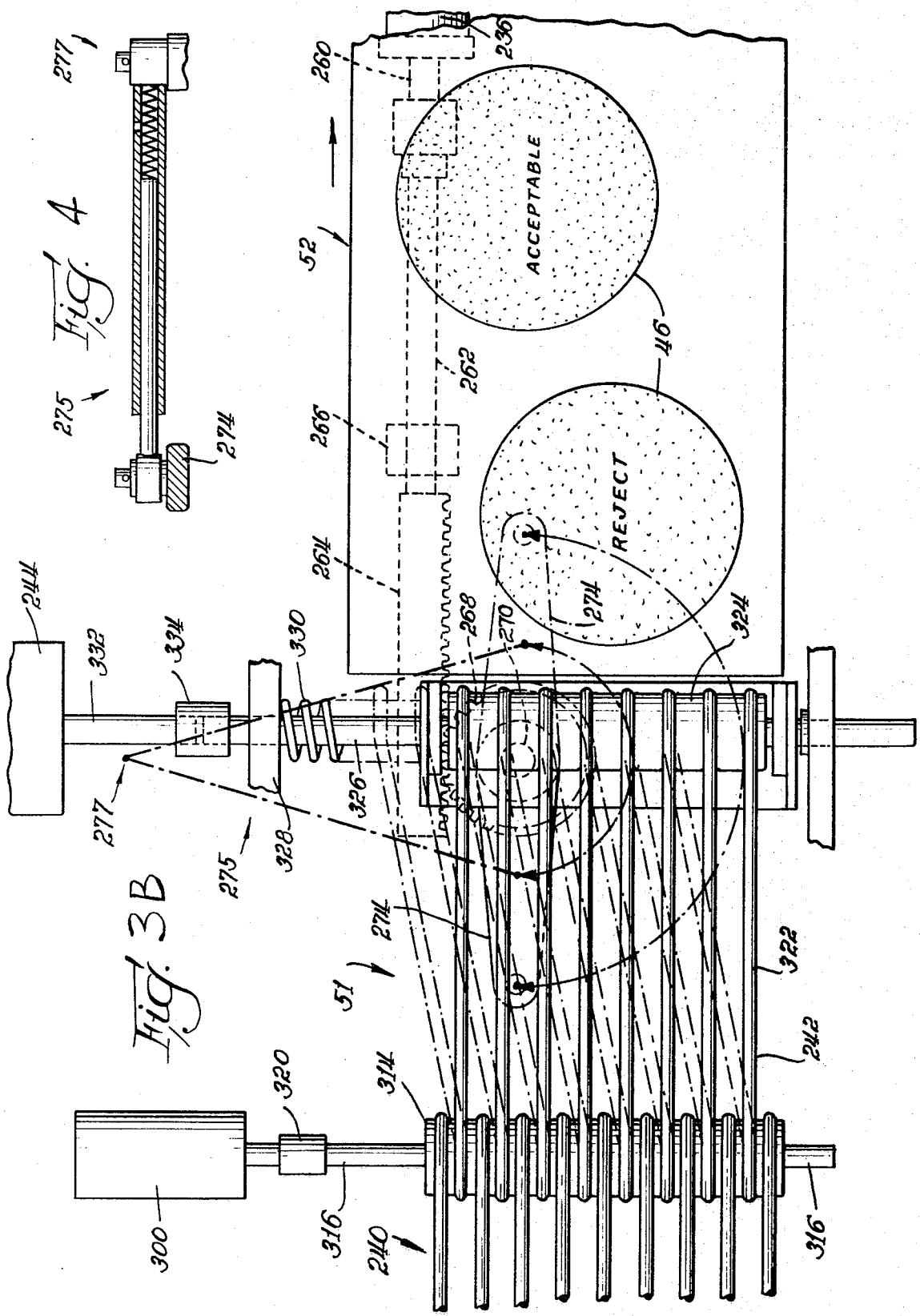

RAPID ACTION ARTICLE TRANSFER APPARATUS

The present invention is directed towards a new and improved apparatus for rapidly transferring successively deposited groups of material from a scale platform or the like and is especially useful in a system for producing weight controlled stacks or groups of counted slices cut from an elongated mass or loaf of a food products such as cold cuts, sausage, cheese or the like. Food products such as process cheese, luncheon meats, bologna, salami and the like are produced in elongated loaves, often four to six feet long, having generally uniform cross-sections of various shapes and dimensions. These products are sold at retail outlets to the consuming public in relatively small packages containing a selected number of relatively thin slices cut transversely from the loaf.

In commercial practice, each package containing a stack or other group of counted slices must have a net food product weight exceeding or at least equal to a weight printed or otherwise indicated on the package. It is desirable to produce such packages which closely meet the weights indicated on the packages with a minimum number of underweight rejects. Also it is very important to minimize the amount of excess food product furnished above the weights indicated on the packages. Thus, great savings can be obtained by mass producing the packages within close tolerances on an automatic weight-controlled slicing system capable of operating at high production rates.

Prior slicing and weighing systems are capable of maintaining production rates of only about 20 percent of the production rate of the apparatus of the present invention. Accordingly, the present invention provides great economic savings in terms of an increased production rate, a reduction in the occurrence of underweight and overweight packages and a significant savings in labor cost per package.

It is therefore an object of the present invention to provide a new and improved rapid transfer apparatus for use in a system for producing weight controlled stacks of counted slices cut from an elongated mass or loaf of food product.

Another object of the present invention is to provide a new and improved apparatus of the character described, which is capable of operating at high production rates.

Another object of the present invention is to provide a new and improved apparatus of the character described which is extremely fast and reliable in operation.

Another object of this invention is to provide new and improved mechanism for transferring successive groups of sliced material from a platform.

Another object of the present invention is to provide new and improved mechanism of the character described comprising a platen having a plurality of fingers adapted to move upwardly through parallel slots extending inwardly from an edge of the platform and a stop member positioned above the platen to engage the uppermost of the slices to limit upward travel of the group as the group is elevated, and means for laterally moving the platen toward and away from the platform.

Another object of the present invention is to provide new and improved mechanism of the character described including means for lifting the platen from a lower to an upper level to elevate a group of slices from a platform at the beginning of a return stroke and for lowering the platen to deposit a group of slices on the upper belt runs of a belt conveyor at the end of a return stroke.

These and other objects, features, and advantages of the present invention will be evident from the following description, with the aid of the accompanying drawings, of a preferred embodiment of the present invention.

Briefly, a system in which the apparatus of the present invention is useful there is provided an automatically controlled apparatus for producing weight controlled stacks of a selected counted number of slices cut from an elongated mass or load of food product. The apparatus includes means for feeding the loaves longitudinally in end-to-end relation along a downward feed path at a substantially constant feed rate into the cutting path of a rotary slicing knife. A stacker mechanism below the cutting path is provided for receiving and accumulating a selected number of slices into groups and then releasing or depositing the groups on a weighing system scale for measuring the weight thereof without requiring interruption of the normal feed rate of the loaves fed to the knife of the slicer. The weighing system provides a signal for initiating speed changes in an adjustable speed motor driving the rotary knife thereby to vary the thickness of the slices being cut from the loaf in response to the weight of a stack or group of slices weighed. The signal from the weighing system is also provided for initiating action of a product accept-reject mechanism which delivers the stacks in succession to a discharge conveyor. The position of delivery to the conveyor is indicative of whether or not the stack is to be accepted or rejected.

The apparatus of the present invention comprises a high speed transfer device for removing the weighed stacks of sliced product from the scale platform of the weighing system and for transferring the stacks to the product accept-reject mechanism.

For a better understanding of the present invention reference should be had to the following detailed description taken in conjunction with the drawings in which:

FIG. 1 is an isometric diagram in schematic animated form illustrating the flow path of movement of product through a slicing system, in which the rapid action transfer apparatus of the invention is utilized;

FIGS. 2A and 2B comprise a side elevational view of a a rapid action transfer apparatus in accordance with the present invention;

FIGS. 3A and 3B comprise a top plan view of apparatus of FIGS. 2A and 2B and also show a product accept-reject mechanism;

FIG. 4 is a sectional view taken substantially along line 4—4 of FIG. 2B.

DESCRIPTION OF THE APPARATUS

Referring now more particularly to the drawings, in FIG. 1 is illustrated in general fashion a new and improved system for producing weight controlled stacks or groups containing a selected number of slices cut from an elongated mass or loaf of food product such as cheese, meats, cold cuts, sausage, etc. The system is especially well adapted for producing discrete or separate groups or stacks of a counted number of slices of food product, each group having a measured weight equal to or exceeding a selected net weight which is printed or indicated on the package in which the stack is sold. The system includes a loader, as shown in copending U.S. application Ser. No. 293,669 filed Sept. 28, 1972, for receiving elongated masses or loaves 32 of food product or the like and elevating, orienting and feeding the loaves in end-to-end relation onto a downward feed path toward a feeder 34. The feeder is adapted to feed the loaves at a selected feed rate into the cutting path of a rotating knife 36 of a slicer 38. The knife is carried on a shaft 38 generally parallel to the feed path of the loaves into the slicer and is driven by a variable speed motor 40 to vary the thickness of the slices to produce stacks or groups meeting a minimum weight requirement for a selected number of slices in a package.

The feeder 34 guides the loaves through a restricted orifice opening 42 in the slicer which compresses and holds the product as the slices are cut therefrom. As the slices are cut by the knife they fall onto a stacker or stacking mechanism 44 for accumulation and separation into groups or stacks 46, each of which contains a counted selected number of slices having a prescribed minimum weight. The stacker 44 accumulates a counted selected number of slices which are fed from the slicer at substantially constant intervals between slices and discharges or deposits the stacks onto a scale platform 220 of a weighing system 48 which includes means for rapidly weighing the stacks and determining whether or not a stack meets the minimum weight requirement. The weighing system provides a control signal for adjusting the speed of the motor 40 and consequently the knife speed to vary the thickness of the slices cut so that subsequent stacks will closely approach a desired optimum weight value. After weighing of the stacks has been completed the stacks are removed from the scale platform by a rapid action transfer apparatus in accordance with the present invention and are classified by a product accept-reject mechanism before deposit onto a discharge conveyor 52.

The weighing system 48, in conjunction with the accept-reject system 51 positions the stacks 46 of slices on the final discharge conveyor 52 in a manner whereby the position of the stacks indicates whether the stack is of acceptable weight or must be rejected because it is underweight or overweight. As shown in FIG. 1, one of the stacks 46 is positioned out of line with respect to the other stacks moving along the conveyor and this out of line position is an indication to an operator at a subsequent processing or machine location that the stack is a reject and should be returned for rework.

In accordance with the present invention, successively accumulated stacks 46 of sliced product cut by the knife 36 are discharged from pairs of cooperating support platens 192L and 192R upon indexing of shafts 188 by stepping motors 186 and 187. The discharged stacks 46 fall downwardly onto a scale platform 220 (FIGS. 2A and 2B) comprising a plurality of spaced apart vertical fingers 222 which are interconnecting at one side and are separated by slots open on the opposite side. The platform 220 is mounted on a support rod which extends downwardly and is connected to move a magnetic core of a weight cell 228. As discussed in further detail hereinafter, the weight cell 228 may comprise a transformer adapted to provide an electrical signal which is responsive to the weight of the stack of slices on the scale platform. Alternatively, the cell may be arranged to provide a signal representing the difference between the stack of slices being weighed and a selected reference or tare weight. The weighing system or mechanism 48 thus provides control signals which are used both for changing the speed of the slicer motor 40 and for activating a product accept-reject mechanism 51 to indicate by placement of the weighted stacks of sliced 46 on the discharge conveyor 52 whether the stacks are within an acceptable weight range. As successive stacks 46 of the sliced product are deposited on the scale platform 220, a repetitive weight measuring cycle is initiated wherein the platform is allowed a period of time to settle so that vibrations from the impact of the falling stack are damped. Following this interval a weight measurement is taken and a signal in response to the measurement is produced. A short interval follows wherein a decision is made to cause the product accept-reject mechanism 51 to accept or reject the stack and to change the rotative speed of the slicer knife 36 if required.

Before the arrival of the next stack of sliced product, the weighed stack is removed from the scale platform 220 by the transfer system which includes a transfer platen 230 movable horizontally and vertically and comprising a plurality of horizontally spaced apart vertical fingers 232 which are adapted to move in and out and up and down without interference within the open spaces or slots 224 between the fingers 222 on the scale platform. As best shown in FIGS. 2A and 2B, while the stack of sliced product is being weighed, it is resting on the upper edges of the scale platform fingers 222 and the fingers 232 of the transfer platen are positioned with their upper edges at a level below the scale platform so as not to interfere with the weighing process before the stack is picked up by the transfer mechanism. After the weighing cycle is completed, the transfer platen 230 moves upwardly to elevate the stack of weighed slices 46 above the scale platform 220 and then moves laterally on a retracting stroke away from the scale (left to right in FIGS. 2A and 2B), to make room for the next stack of slices to be deposited on the scale platform. The transfer platen is supported from a reciprocally movable transfer carriage 234 which is activated to move on advancing and retracting strokes by means of a carriage control cylinder 236 controlled by a solenoid actuated valve. As indicated diagramatically in FIGS. 2A and 2B the transfer platen 230 moves from a right hand starting or release position along a lower level (arrow "F") on an advancing stroke after a new stack of sliced product has been deposited on the scale platform 220 for weighing. After reaching a left hand or pickup position at the lower level and when the weighing cycle is complete, the transfer platen 230 moves upwardly (arrow "G") to lift the stack of slices from the scale platform. The platen continues on a retrack stroke (arrow "H") from the lifting or pickup position toward the right along an upper level. After the elevated stack of slices clears the right hand edge of the scale platform, the transfer platen 230 is urged downwardly from the upper level on a release or deposit stroke and the stack 46 of slices is deposited onto the upper belt runs of the transfer conveyor 240. The transfer conveyor 240 moves the weighed stacks 46 onto an upwardly sloped product accept-reject conveyor 242 of the accept-reject mechanism 51 and ultimately the weighed stacks of slices are deposited onto the discharge conveyor 52 in a position which indicates whether or not the particular stack meets the acceptable minimum weight requirement and is within an acceptable weight range. Mechanical means may be provided for removing the rejected stacks for further rework or processing while the acceptable stacks moving along the conveyor 52 are ready for further processing or packaging for market.

The weighing system 48 includes a large, heavy, base structure 246 supported independently so that the weight cell 228 will be mounted on a stable solid base isolated from the vibrations of other portions of surrounding mechanism. An adjustable base assembly 248 is provided for precisely positioning the scale platform 220 and the associated weight cell 228 in order that the stacks 46 discharged from the stacker platens 192L and 192R will center on the scale. A threaded adjustable support post 250 is provided to adjust the vertical level of the upper surface of the scale platform 220 so that only a small amount of upward travel of the transfer platen 230 is required to lift or elevate a stack 46 (arrow "G") from the scale platform for lateral transfer to the conveyor 240. Moreover, if the stack weight is changed the weight cell 228 may be provided with a different tare weight and the adjustment post compensates to maintain a constant level of the scale platform relative to the transfer platen.

As the fingers 232 of the transfer platen 230 move upwardly to elevate a stack of slices from the scale platform 220, the stack may tend to jump upwardly and a stop member 252 is provided to limit upward travel of the stack during the pickup stroke. The upper stop is interconnected to reciprocating carriage 234 by suitable interconnecting structure indicated by the reference number 251. The carriage 234 for supporting the transfer platen 230 is mounted on a pair of horizontal guide rods 256 supported at opposite ends from a main base of frame structure 258 of the transfer mechanism 50. The carriage 234 includes a plurality of sleeves slidable on the support rods 256 so that the carriage can move back and forth between the left hand pickup position and the right hand release position. As a stack 46 of weighed slices is lifted from the scale platform 220 by the transfer platen 230 and is moved on a retract stroke toward the right, a minimum spacing is provided between the stop member 252 and the upper surfaces of the fingers 232 of the transfer platen. The stack is held against the stop member by upward pressure from the platen 230 and the stack itself limits the upward movement of the platen during the pickup and retraction strokes.

The stop 252 is adjustable vertically with respect to the upper level travelled by the transfer platen 230 in order to accommodate stacks 46 of different height or thickness. The stop is slidably supported on a rod 249 and reciprocates thereon in a horizontal direction in unison with the carriage 234. The stop support rod 249 is mounted on a vertical adjustable frame 253 supported on a pair of threaded posts 255. The posts extend upwardly and downwardly from a base plate 257 of the frame 258 in bosses 259 having threaded vertical apertures for the posts.

Rotation of the posts 255 in unison to maintain a level attitude of the stop 252 during vertical adjustment is achieved by two sprockets 259 on the lower end of the posts and another sprocket on a hand wheel shaft 261. The three sprockets are drivingly interconnected by a chain 263 so that rotation of hand wheel 265 drives the post up or down to adjust the height of the stop 252 for a particular height of stack being handled.

The carriage control cylinder 236 includes a piston rod 260 connected at its outer end to an elongated drive member 262 having a toothed rack member 264 attached to an intermediate section of the member for reciprocal movement between a pair of support bearings 266. The teeth of the rack 264 are meshingly engaged with a pinion 268 mounted adjacent the lower end of a vertical oscillating shaft 270 supported in an upstanding bearing assembly 272. As the piston rod 260 is advanced and retracted, the rack 264 causes the pinion shaft 270 to rotatively oscillate back and forth about its vertical axis and a radial arm 274 secured to the upper end of the pinion shaft 270 swings through an arc of approximately 180° between a forward direction (left hand position FIGS. 2A and 2B) extending toward the scale platform 220 and an opposite (right hand) retracted position (not shown) extending away from the scale platform. In order to dampen oscillations of the arm 274 at the end of its arcuate swings, a dampener rod assembly 275 (FIGS. 3A, 3B and 4) is pivotally connected to the arm intermediate its length. The opposite end of the dampener rod assembly is connected to a fixed pivot axle 277 spaced eccentric in relation to the pivot axis of the arm 274. The dampener rod assembly includes a rod slidable in a sleeve having a compressing spring in one end biasing the rod outwardly as shown in FIG. 4. The arm 274 is pivotally connected adjacent the other end through a connector pin assembly 276 to one end of an elongated actuating rod 278 for driving the transfer platen. The transfer platen is attached to the forward end of a pair of parallel, generally horizontal side frames 280. The side frames are interconnected with the carriage 234 at their left and right hand ends through pairs of short links 282 and 284 pivotally attached to the respective left and right ends of the carriage. The carriage 234, the side frames 280, and the link members 282 and 284 form a parallelogram type interconnecting linkage between the transfer platen 230 and its supporting reciprocating carriage 234. As shown diagrammatically by the parallelogram formed by the arrows "F," "G," "H," and "I" in FIGS. 2A and 2B, the transfer platen 230 moves horizontally at a lower level from a right hand rest position on an advancing stroke to a left hand pause position beneath the scale platform 220 ready for pickup. The transfer platen momentarily pauses as the weighing cycle is completed and then moves upwardly on a pickup stroke (arrow "G") curving toward the right until upper travel is stopped by the compression of the stack 46 against the stop 252. The platen continues along an upper horizontal path on a retract stroke from left to right (arrow "H") and, during this stroke, the pivot links 282 and 284 slope upwardly at a maximum angle as indicated by the dotted lines. At the end of the retraction stroke, the platen is forced downwardly by engagement of a cam roller 286 mounted on one side frame 280 with a cam 288 having a downwardly and rearwardly curved cam surface. The cam 288 is supported from the base structure 258 of the transfer mechanism 50 and engagement between the cam roller. The cam surface biases the side members 280, which support the platen 230, downwardly on a discharge or deposit stroke indicated by the arrow "I."

As the platen 230 is cammed downwardly, the stack 46 of sliced product carried thereby is deposited on the upper run of the transfer conveyor 240 which is moving left to right (FIGS. 2A and 2B). As the platen 230 moves downwardly on the deposit or discharge stroke, the links 282 and 284 pivot in a counterclockwise direction about the lower pivot axes until the upper surface of the transfer platen 230 is below the upper level of the upper belt run of the conveyor 240. The stack 46 is then moved to the right by the belt conveyor as indicated by the arrow "J."

The left hand end of the actuating rod 278 is pivotally connected via a spherical ball joint connector 290 to a cross member 292 (dotted lines FIGS. 2A and 2B) which transversely interconnects the right hand pivot links 284 between the transfer platen 230 and the carriage 234. With the platen 230 at the right hand position at its lower level, an advance stroke of the carriage control cylinder 236 causes the arm 274 to swing through 180° in a clockwise direction toward the position shown and this causes the connector rod 278 to advance from right to left pushing the side frames 280 in the same direction. Because the level of push is above the level of the carriage 234, on an advancing stroke the platen 230 and carriage 234 move in unison together. Because of the rotary movement of the arm 274, the platen 230 accelerates slowly to a maximum value at the middle of the advancing stroke and then decelerates at a decreasing rate as it approaches the left hand position awaiting pickup of a weighed stack of slices 46 from the scale platform. The flow of fluid into the carriage control cylinder 236 is then reversed by the carriage control solenoid valve 238 to retract the rod 260 and the arm 274 is pivoted in a counterclockwise direction causing the drive 278 to be retracted toward the right. As this occurs, because the pull is exerted at a level above the carriage 234 which has greater inertia and tends to remain in its stationary position, the side frames 280 and platen 230 begin to move to the right before the carriage follows. As this occurs, the connecting links 282 and 284 pivot to an increased slope in a clockwise direction and the platen 230 moves upwardly on its pickup stroke until the stack of sliced product is in compression against the stop 252. Compression of the stacks 46 limits the upward extent of angular pivotal movement between the links 282 and 284 and the side frame 280 and the upper level of the platen 230. The carriage 234 then begins to follow the side frames on the retract stroke as and near the end of the stroke the engagement of the cam roller 286 engages the curved surface of the cam 288 and moves the platen downwardly to deposit the stack 46 on the upper run of the transfer conveyor 240. A stop member 296 is provided to limit the vertical minimum spacing between the side frame 280 and the carriage 234. The parallelogram linkage described thus provides for adjustable vertical spacing between the transfer platen 230 and the carriage 234 and for horizontal adjustment between the platen and carriage.

Referring specifically to FIGS. 2A, 2B, 3A and 3B of the drawings, the transfer conveyor 240 includes a plurality of endless belts 302 aligned in spaced apart parallel vertical planes aligned and centered with respect to the fingers 222 on the scale platform 220. The fingers 232 of the transfer platen 230 thus are clear to move back and forth freely between the slots in the scale platform and open spaces or slots 304 between left hand segments of the belts 302. At the left hand end, (FIG. 11) each belt is supported on an idler pulley mounted for rotation at the outer end of a thin finger-like support blade 306 (FIGS. 2A and 2B). Intermediate the opposite ends of the belts there is provided a plurality of idler pulleys 308 mounted on a shaft 310 and separated by spools or disc-like spacers 312 which provide parallel spacing between the individual belts as indicated in the plan view of FIGS. 13A and 13B. At the right hand end of the belts 302 there is provided a drive roll 314 secured to a drive axle 316 and provided with a plurality of belt grooves in its periphery, alternate ones of which receive the endless belts 302 in driving engagement therewith. The driven shaft is supported by bearings 318 and is connected to a product discharge conveyor motor 300 with a drive coupling 320.

Other grooves provided in the drive roll 314 between the grooves for the belts 302 are used for engagement by a plurality of endless belts 322 of the product accept-reject conveyor 242 of the mechanism 51. As shown in FIGS. 2A and 2B, the upper belt runs of the endless belts 322 move toward the right (indicated by the arrow "K") and are inclined upwardly to carry the stacks 46 to a level high enough for discharge onto the product discharge conveyor 52. The belts 322 may be formed of a stretchable elastic material such as rubber or the like and may be of an O-ring type conventionally used in the construction of belt conveyors. The product accept-reject conveyor 242 is adapted to have its discharge or output end shifted laterally, with a resultant stretching or contracting of the belts 322, thereby indicating by the position of the product stacks 46 deposited on the discharge conveyor 52 whether or not a particular stack meets the desired weight range criteria. As illustrated in FIGS. 1, 3A and 3B, acceptable stacks 46 are deposited and aligned toward one side of the conveyor 52 while the rejected stacks are displaced laterally.

The discharge end of the accept-reject conveyor 242 is provided with a grooved idler roll 324 mounted on an axially shiftable shaft 326 supported between a pair of bearing assemblies 328. As shown in FIGS. 3A and 3B, the shaft 326 is biased by a coil spring 330 towards a reject alignment and as indicated by the dotted lines the runs of the belts 322 may be shifted angularly to change point of discharge into line with the opposite side of the conveyor 52. The other end of the shaft 326 is rotatively connected to the armature 332 of the product accept-reject solenoid via a coupling 334.

When an appropriate signal produced in the weighing system 48 indicates that the stack weighed on the scale platform 220 is acceptable after a time delay, the solenoid 244 is energized to pull the armature 332 inwardly thereby shifting the shaft out of the spring biased reject position to discharge the product in the position indicating acceptance. In the event that any weighed stacks 46 do not meet the minimum weight requirement or do not fall within a desired weight range, or if an equipment failure occurs such that the solenoid 244 is not energized, the stacks are discharged as rejects.

Obviously, many modifications and variations are possible in light of the above disclosure. Thus, it is to be understood that, within the scope of the appended claims, the invention may be practiced otherwise and as specifically described.

What is claimed and desired to be secured by Letters Patent of the United States is:

1. Apparatus for rapidly transferring successively deposited groups of sliced material from a platform having an upper support surface and having parallel slots extending inwardly from an edge of said platform, comprising a platen having a plurality of parallel fingers adapted to move upwardly through said slots to elevate a group of slices from said platform, a stop member positioned above said platen to engage the uppermost of said slices to limit upward travel of said group as said group is elevated, means supporting said platen for movement toward and away from said stop member to hold and release said slices, and means for laterally moving said platen toward and away from said platform between a pickup position adjacent said platform and a laterally spaced released position remote from said platform on a linear advancing stroke away from said release position toward said pickup position while in a lower plane located below said support surface of said platform and on a linear return stroke in an opposite direction while in an upper plane parallel to said lower plane and located above said support surface of said platform, and means for reciprocating said stop member in a plane parallel to said planes and located above said platen.

2. The apparatus of claim 2 including a conveyor having parallel upper belt runs spaced apart to permit said fingers to move between said runs and positioned to receive a group of slices deposited by said platen on said belt runs, said supporting means including means for lowering said platen to a level below said belt runs to release said group onto said conveyor upon movement away from said platform.

3. The apparatus of claim 2 wherein said lowering means includes cam and follower means for moving said platen downwardly upon movement away from said platform.

4. The apparatus of claim 1 including means operatively interconnecting said supportng means and said moving means for lifting said platen from said lower to said upper level to elevate a group of slices from said platform at the beginning of a return stroke.

5. The apparatus of claim 1 including means operatively interconnecting said support means and said moving means for lowering said platen to deposit a group of slices on said upper belt runs at the end of a return stroke.

6. The apparatus of claim 5 wherein said platen is moved on a path defining a parallelogram extending between said platform and said belt runs for transferring said groups of slices from the former to the latter.

7. The apparatus of claim 1 wherein said moving means includes a carriage mounted for reciprocal movement at a level spaced from said lower and upper level of said advancing stroke of said platen, said supporting means including pairs of support links pivotally interconnecting said platen and said carriage to provide adjustably vertical and horizontal spacing therebetween and means for reciprocally moving said platen to change said vertical and horizontal spacing.

8. The apparatus of claim 7 wherein said means for reciprocally moving said platen comprises an arm pivotal about an axis and having an outer end movable on an arc between positions extending toward and away from said platen, means interconnecting the outer end of said arm and said platen and means oscillating said arm in opposite directions about said axis.

9. The apparatus of claim 1 wherein the planes in which said platen is moved and the plane in which said stop member is reciprocated are horizontal.

* * * * *